(12) United States Patent
Guyer (10) Patent No.: US 7,284,709 B2
(45) Date of Patent: Oct. 23, 2007

(54) SYSTEM AND METHOD FOR HYDRONIC SPACE HEATING WITH ELECTRICAL POWER GENERATION

(75) Inventor: Eric C. Guyer, Dover, MA (US)

(73) Assignee: Climate Energy, LLC, Medfield, MA (US)

( * ) Notice: Subject to any disclaimer, the term of this patent is extended or adjusted under 35 U.S.C. 154(b) by 298 days.

(21) Appl. No.: 10/832,611

(22) Filed: Apr. 27, 2004

(65) Prior Publication Data

US 2005/0161521 A1    Jul. 28, 2005

Related U.S. Application Data

(63) Continuation-in-part of application No. 10/704,358, filed on Nov. 7, 2003, now Pat. No. 7,040,544.

(51) Int. Cl.
*F24D 5/00* (2006.01)

(52) U.S. Cl. .................................... 237/12.1; 60/39.01

(58) Field of Classification Search ............... 237/12.1, 237/12.3 B; 60/39.01, 793, 624, 696
See application file for complete search history.

(56) References Cited

U.S. PATENT DOCUMENTS 3,944,837 A    3/1976    Meyers et al.

(Continued)

FOREIGN PATENT DOCUMENTS

DE    101 11 072 A1    10/2002

(Continued)

OTHER PUBLICATIONS

"Notification of Transmittal of the International Search Report and the Written Opinion of the International Searching Authority, or the Declaration" International Application No. PCT/US2005/013425 with an International Filing date of Apr. 19, 2005.

(Continued)

*Primary Examiner*—Derek S. Boles
(74) *Attorney, Agent, or Firm*—Cesari and McKenna LLP (57) ABSTRACT

This invention provides a system and method for cogeneration of electric power and building heat that efficiently interfaces a liquid-cooled electric power generator with a multi-zone forced hot water (hydronic) space heating system. The system and method utilizes an electric generator with an electric output capacity (kW) that is near the time-averaged electric power consumption rate for the building and with a heat generation capacity that is useful for meeting building heating needs. This generator is operated as the priority source of heat for the building, but normally only when there is a demand for heat in building, with the intent of running the generator for long periods of time and generating a total amount of electric energy (kWhs) that is significant in comparison to the total electric energy consumption of the building over time. The actual onsite time-variable power demand (kW) is met by a combination of the cogenerated electric power produced on site and quantities of electric power from the public electric power grid or another external power source. Hence, useful electric power is generated on site as a by-product of the required generation of heat for space or water heating. The generator is run at a speed/operating condition that is appropriate to maintaining a long operational life.

32 Claims, 4 Drawing Sheets

U.S. PATENT DOCUMENTS

| | | | |
|---|---|---|---|
| 4,065,055 A * | 12/1977 | De Cosimo | 237/12.1 |
| 4,099,374 A * | 7/1978 | Foster-Pegg | 60/39.12 |
| 4,150,300 A * | 4/1979 | Van Winkle | 290/2 |
| 4,201,924 A * | 5/1980 | Uram | 290/40 R |
| 4,226,214 A | 10/1980 | Palazzetti | |
| 4,353,207 A * | 10/1982 | Lee | 60/39.182 |
| 4,432,336 A * | 2/1984 | Black | 126/91 R |
| 4,607,169 A * | 8/1986 | Donnelly, Jr. | 290/54 |
| 4,621,681 A * | 11/1986 | Grover | 165/47 |
| 4,731,547 A * | 3/1988 | Alenduff et al. | 307/85 |
| 4,736,111 A | 4/1988 | Linden | |
| 4,752,697 A | 6/1988 | Lyons et al. | |
| 4,754,607 A * | 7/1988 | Mackay | 60/723 |
| 4,896,500 A * | 1/1990 | Pavel et al. | 60/39.182 |
| 4,915,062 A * | 4/1990 | Dolezal | 122/406.5 |
| 5,226,594 A | 7/1993 | Swenson | |
| 5,233,826 A * | 8/1993 | Cheng | 60/775 |
| 5,535,944 A | 7/1996 | Knowles | |
| 5,617,504 A * | 4/1997 | Sciacca et al. | 392/307 |
| 5,799,481 A * | 9/1998 | Fetescu | 60/783 |
| 5,819,843 A | 10/1998 | Inoue et al. | |
| 5,925,223 A * | 7/1999 | Simpson et al. | 203/11 |
| 6,044,640 A * | 4/2000 | Guimaraes | 60/783 |
| 6,053,418 A | 4/2000 | Guyer | |
| 6,085,513 A * | 7/2000 | Hamill et al. | 60/775 |
| 6,161,386 A * | 12/2000 | Lokhandwala | 60/649 |
| 6,220,522 B1 | 4/2001 | Suzuki | |
| 6,230,494 B1 | 5/2001 | Botti et al. | |
| 6,269,626 B1 * | 8/2001 | Kim | 60/39.182 |
| 6,389,794 B2 * | 5/2002 | Ranasinghe et al. | 60/775 |
| 6,422,022 B2 * | 7/2002 | Gorman et al. | 60/771 |
| 6,499,302 B1 * | 12/2002 | Ranasinghe | 60/772 |
| 6,598,397 B2 * | 7/2003 | Hanna et al. | 60/651 |
| 6,662,563 B1 | 12/2003 | Nordentoft | |
| 6,663,011 B1 * | 12/2003 | Entleutner | 237/12.1 |
| 6,688,048 B2 * | 2/2004 | Staschik | 52/79.1 |
| 6,694,772 B2 * | 2/2004 | Inoue et al. | 62/497 |
| 6,792,759 B2 * | 9/2004 | Rollins, III | 60/773 |
| 6,833,056 B1 * | 12/2004 | Kamiya et al. | 202/155 |
| 2003/0230534 A1 * | 12/2003 | Donaldson et al. | 210/652 |

FOREIGN PATENT DOCUMENTS

| | | |
|---|---|---|
| DE | 103 19 645 A1 | 11/2003 |
| EP | 0 457 399 A2 | 5/1991 |
| EP | 1 030 123 A2 | 8/2000 |
| EP | 1 045 127 A2 | 10/2000 |
| EP | 1 327 835 A2 | 7/2003 |
| WO | WO 98/26221 | 6/1998 |
| WO | WO 01/90656 A1 | 11/2001 |
| WO | WO 03/052254 A1 | 6/2003 |

OTHER PUBLICATIONS

Bezilla et al., An Introduction of MCHP Unit for Residential Use, National Micro-CHP Technology Pathways Workshop, Jun. 11, 2003, all pages.

Powering Your Home or Small Business, Vector CoGenLLC Technical Specifications Parallel with grid or standalone Cogenerators, Sep. 1, 2003, Http://www.vectorcogen.com/pages/specifications.htm, all pages.

U.S. Appl. No. 10/704,358, filed Nov. 7, 2003 by Eric C. Guyer for a System and Method for Warm Air Space Heating with Electrical Power Generation, all pages.

* cited by examiner

SYSTEM AND METHOD FOR HYDRONIC SPACE HEATING WITH ELECTRICAL POWER GENERATION

CROSS-REFERENCE TO RELATED APPLICATIONS

The present application is a continuation-in-part of commonly assigned U.S. patent application Ser. No. 10/704,358, which was filed on Nov. 7, 2003 now U.S. Pat. No. 7,040,544, by Eric C. Guyer for a SYSTEM AND METHOD FOR WARM AIR SPACE HEATING WITH ELECTRICAL POWER GENERATION, and is hereby incorporated by reference.

BACKGROUND OF THE INVENTION

1. Field of the Invention

This invention relates to the cogeneration of space/water heat and electrical power.

2. Background Information

In most regions of North America, space heating of buildings is a necessity for some portion of the year to maintain thermal comfort. Buildings are space-heated in a variety of ways, with one of them being so-called forced hot water or "hydronic" heating, using a pump to recirculate water in a closed system through a "boiler" for heating, through pipes, and to a variety of space heating devices such as baseboard fin-tube radiators, radiant panels, and radiant floor heating tubing or to a number of separately controlled zones incorporating such a variety of space heating devices. The majority of such boilers are warmed directly by using the hot gases produced by a fossil fuel burner. The closed loop hydronic water circuit can also be used to produce a heated or "hot" domestic water supply by way of a heat exchanger.

Buildings also require a source of electric power. Hydronic heating systems are in themselves a user of electric power to operate the hydronic water pump(s), the burner, and the electrically operated valves. This electric power is normally provided by an electric utility through the local electric grid, with the generation of the electric power occurring at large power stations remotely located from the building. All forms of electric power generation at large remotely located generating plants result in a large fraction of the fuel energy being normally dissipated as waste heat. The combination of electric power generation with useful application of the heat energy that is inevitably produced during electric power generation is generally termed "cogeneration." Cogeneration is the simultaneous production of useful electric power and heat from the same fuel and fuel burner.

Small-scale cogeneration of heat and electric power from fossil fuels to meet the on-site energy needs of residential and commercial buildings represents a major opportunity for reduction of energy costs and pollutant emissions, including $CO_2$, a "so-called" greenhouse gas. There is a general trend in the regulatory management of energy resources to specifically allow and encourage the tie-in of small-scale cogeneration and renewable energy systems into the existing electric utility grid. This benefits the power generating authorities by allowing them to delay construction of new capacity. However, there is as yet no widespread use of small-scale cogeneration. The technical and economic inadequacies of existing small-scale cogeneration technologies, as well as historical energy supply and regulatory practices, have perpetuated this situation. A number of small-scale power generation technologies are emerging that may be used in such small-scale combined heat and power systems. These include internal combustion engines, Stirling engines, fuel cells, and steam engines. Small-scale combined heat and power systems are now commonly referred to as micro-combined heat and power systems or, more briefly, "micro-CHP" systems and will be referred to as such in this discussion for convenience.

To date, little attention has been paid specifically as to how such small-scale power generation technologies could be practically integrated into hydronic (i.e. forced hot water) system. Nearly all candidate generator technologies suitable for use in small-scale cogeneration of electric power and heat incorporate a liquid cooling (for example, glycol, water, and mixtures thereof) circuit. However, there are important practical technical considerations and limitations with respect to use and integration of such candidate electric generator technologies so as to limit the simple attachment of such generators to hydronic heating systems. New integrated design and operation strategies for hydronic heating systems incorporating micro-CHP are needed to gain full performance potential. An integrated system design as described herein that addresses the combined and complementary mechanical, thermal, electrical power and control characteristics of all system components is essential to practical realization of hydronic systems with cogeneration capability.

Many prior art cogeneration systems are targeted toward large-scale facilities, with designs that do not scale-down to a residential/small commercial application. They may involve the use of gas turbines and steam plants that cannot be reproduced for a residence. While attempts to produce a small-scale cogeneration system have been made, these either do not interface with commonly used residential and small commercial hydronic heating systems, or are impractical to employ in a "real-world" application at the residential and small commercial level. In particular, the specific issues associated with operation with a multi-zone residential and commercial hydronic heating systems have not been addressed. To date, micro-CHP system of the size most suitable for residential homes has been significantly commercially introduced only in Japan and the designs of these systems are not generally preferred for North American residential heating applications and customary practices. For example, U.S. Pat. No. 6,435,420 shows one such system originating in Japan. This patent teaches that the system is configured so that heat from the engine unit is transferred, with a separate coolant circuit, into potable water in tank; and the heat is again transferred from the potable water, through another heat exchanger, into a closed hydronic heating loop. This system allows for the use of heated potable water produced by the engine as a reserve of heat energy for hydronic space heating. This system works well for the particular implementation in typical Japanese residence, where the space heating load is low. This system also works effectively where relatively low hydronic heating water temperatures (e.g. potable water temperatures) are permissible, but this system of limited advantage in typical North American applications that tend to require relatively high hydronic water temperatures. Also, this prior art system requires storage tank and heat exchanger assemblies not commonly produced in North America. In addition the above-described prior art design does also not take into account the "net metering" utility interconnection that is available in the United States, and that provides for maximizing the economic advantages of cogeneration under the prevailing operational situation.

Taken individually, or as a whole, the prior art fails (for typical North American thermal energy load characteristics, engineering practices, and commonly-available and cost-effective component configurations) to provide an overall design and operating logic for a practically implemented fuel-burning forced hot water heating system with modern features combined with an efficient, fuel-burning electric generator with liquid heating capability with such combination system providing multi-zone space heating for thermal comfort while simultaneously maximizing the operation of the electric generator for the cogeneration of heat and electric power and providing important additional functionality such as emergency power supply and domestic water heating. Hence, a practical, state-of-the-art and efficient small-scale cogeneration system, that is particularly suitable for use as a modern forced hot water heating system employed in many homes and enterprises, is highly desirable.

SUMMARY OF THE INVENTION

This invention overcomes the disadvantages of the prior art by providing a system and method for cogeneration of electric power and building heat that efficiently interfaces a liquid-cooled electric power generator with a multi-zone forced hot water (hydronic) space heating system. The system and method utilizes an electric generator with an electric output capacity (kW) that is near the time-averaged electric power consumption rate for the building and with a heat generation capacity that is useful for meeting building heating needs. This generator is operated as the priority source of heat for the building, but normally only when there is a demand for heat in building, with the intent of running the generator for long periods of time and generating a total amount of electric energy (kWhs) that is significant in comparison to the total electric energy consumption of the building over time. The actual onsite time-variable power demand (kW) is met by a combination of the cogenerated electric power produced on site and quantities of electric power from the public electric power grid or another external power source. In essence, useful electric power is generated on site as a byproduct of the required generation of heat for space or water heating. The generator is run at a speed/operating condition that is appropriate to maintaining a long operational life.

In an illustrative embodiment, the heat output of the electric generator is directed via a liquid coolant circuit on the generator to a heat exchanger. Heat is transferred in the heat exchanger from the coolant to the closed loop hydronic (water) heating system of the building. The heat is then usefully applied to heat the spaces within the building using any of several of the customary hydronic space heating devices such as baseboard radiators, radiant panels, or under-floor tubing. When heat from the electric generator is insufficient to heat the building fully, an auxiliary heater in the form of a conventional hydronic boiler, operated typically by burning fuel, supplements the heat provided by the engine generator. The water circulating pump of the hydronic heating system is controlled variably in speed to create the most efficient use of electric power.

In an illustrative embodiment, the various heating zones in the building are operated in a manner by a control system such that the heat produced by the generator is optimally applied to the different zones to maintain the desired space temperature in each zone while simultaneously maximizing the run time and minimizing the starting and stopping of the electric generator. A control module is provided to regulate these and other relationships between operational components so that, during heating, the utilization of the power generator as the heat source is maximized, the power consumption of the heating system components is minimized, the use of the auxiliary heating hydronic boiler is minimized, all components are maintained within their operational temperature limits, and the thermal comfort is maintained in the different heating zones in the building.

An outdoor temperature sensor can be beneficially used, along with a zone operation control strategy, to improve the heat demand anticipation of the system and further maximize the use of the electric generator as a heat source. Domestic potable water heating can be provided by exchange of heat from the hydronic water circuit through a heat exchanger, with heat produced preferably by the engine-generator and then, if needed, by the auxiliary hydronic boiler. The auxiliary boiler and generator combinations can share combustion air intake ductwork and combustion product vents as well as condensate drains. The engine electric generator can be mounted indoors or outdoors. During periods of electrical grid power failure and when heat is not needed, the system provides for the operation of the electric generator for emergency power. Similarly, when the generator must take over for the power grid in the event of an outage, it may be run by the control module at a higher electric power output level/speed and excess heat may be dissipated if necessary.

BRIEF DESCRIPTION OF THE DRAWINGS

The invention description below refers to the accompanying drawings, of which.

DETAILED DESCRIPTION OF ILLUSTRATIVE EMBODIMENTS

Figure 1:
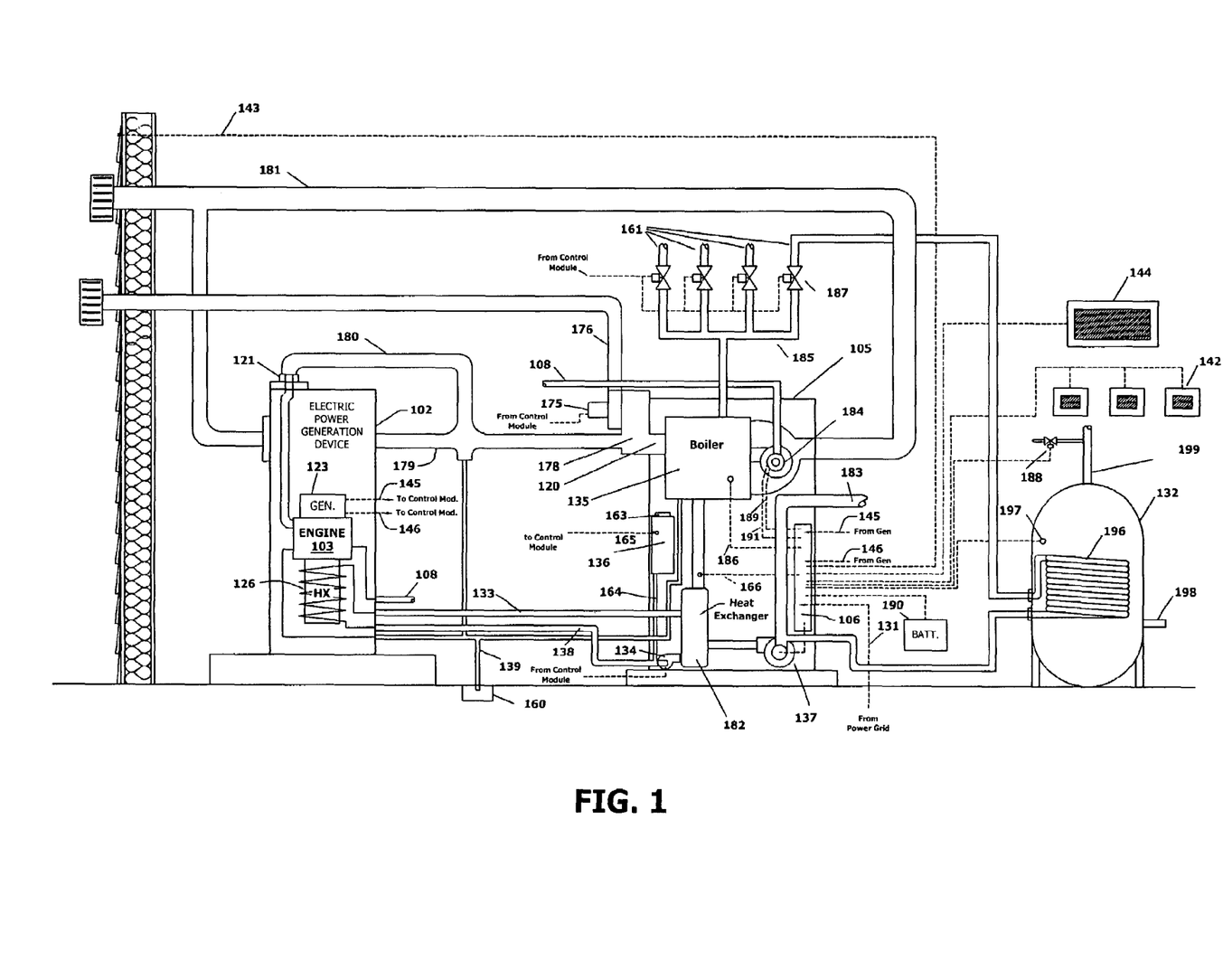
FIG. 1 is an exposed view of a hydronic (forced hot water) heating micro-CHP system according to an illustrative embodiment employing an indoor-installed power generator.

FIG. 1 illustrates a hydronic heating micro-CHP system installed in a typical North American residential application according to an embodiment of this invention. This system is related to that described in the incorporated-by-reference U.S. patent application Ser. No. 10/704,358, which was filed on Nov. 7, 2003, by Eric C, Guyer for a SYSTEM AND METHOD FOR WARM AIR SPACE HEATING WITH ELECTRICAL POWER GENERATION. Unless different elements and methods are described, it can be assumed, where appropriate that elements and methods described in the above incorporated-by-reference U.S. patent application Ser. No. 10/704,358 can be employed in connection with the teachings of this invention.

FIG. 1 is best understood by recognition that there are three separate liquid fluid circuits in the system. Briefly, these are the "engine coolant" circuit, the "hydronic water" circuit, and the "domestic (potable) hot water" circuit. For clarity, the terms, "engine coolant," "hydronic water," and "domestic hot water" are used in this description to differentiate between the different liquid flow circuits.

The engine coolant circuit is a low-pressure recirculating fluid system composed of one side of the heat exchanger 182, the conduit 133, the engine heat exchanger 126, the conduit 138, the liquid coolant pump 134, and the coolant reservoir tank 136. The purpose of the engine coolant circuit is to transfer heat from within the internal structure of the engine and its associated components to the hydronic heating circuit. The engine coolant circuit is filled with a fluid that provides for proper corrosion protection of the engine components for prolonged service life. This fluid can be, for example, a glycol-based, commercially available coolant. The only pressure in the system is that provided by the hydrostatic head on the coolant reservoir 136 and whatever circulating pressure is developed by the pump 134.

The heat exchanger 182 protects the internal cooling passages of the engine from contamination by deposits and corrosion that would likely occur if water of uncontrolled quality and chemical characteristics, such as that contained in the hydronic heating circuit or in the domestic hot water circuit, were to be used directly in the engine heat exchanger. The heat exchanger 182 also avoids the cost and inconvenience of using such engine coolant liquid throughout the entire heating system. Such an engine coolant may be any of a variety of commercial and proprietary water, chemical, and organic liquid mixtures that contain corrosion inhibitors, pH control additives, or other additives.

The coolant reservoir 136 is located above the coolant pump and near the pump intake and is connected to the line 138 such that there is normally no net flow of coolant to and from the reservoir, and so that a minimum hydrostatic pressure of coolant is always present at the inlet of the engine coolant pump 134. Air can escape the engine coolant circuit during its initial filling and operation, and the temperature of the reservoir is near room temperature so as to minimize potential evaporation of the coolant. This particular configuration also facilitates filling of engine coolant circuit by the straight-forward pouring of engine coolant into an opening (see cap 163) on the top of the coolant reservoir 136. The coolant reservoir 136 opening can be sealed with a threaded or snap-on cap 163 to minimize evaporation from the tank over the course of time, but such cap may include a small breather hole so as to allow for the expansion and contraction of the volume of the engine coolant while maintaining relatively constant hydrostatic pressure in the system. The engine coolant reservoir 136 contains a coolant level detector 165 that provides a signal, through the controller 106 and the display 144, which monitors and alerts the user as to when the coolant level is low and is in need of replenishment. The use of an automatic coolant replenishment system is also contemplated by this invention.

Figure 4:
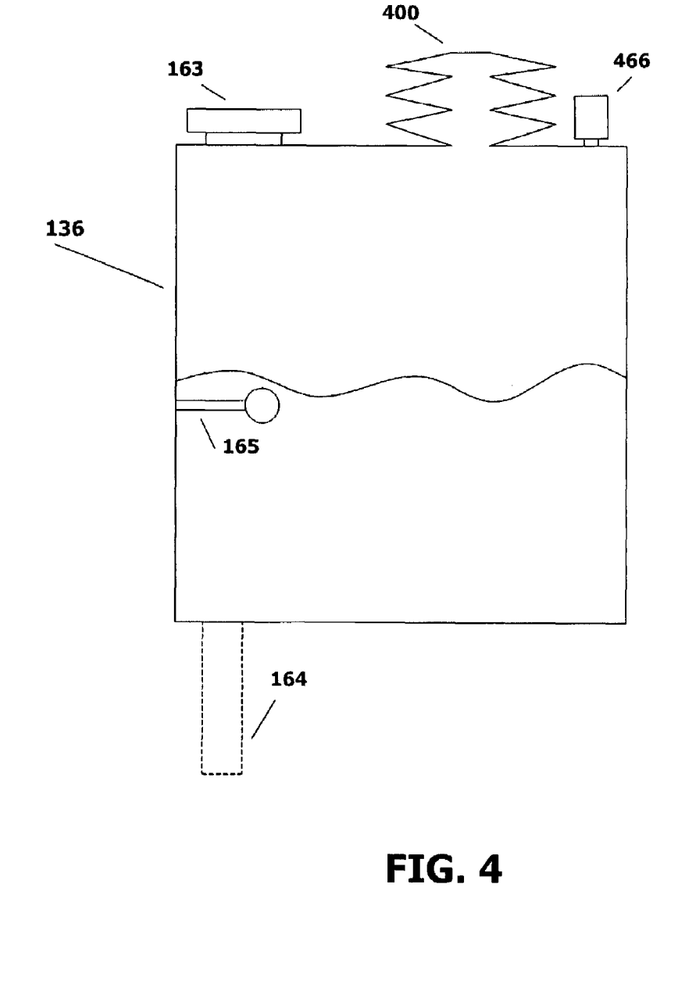
FIG. 4 is a somewhat schematic diagram of the hydronic heating micro-CHP system according to an alternate embodiment.

The use of a commercially available flexible diaphragm or bellows type expansion volume as part of the reservoir 136 is also contemplated for those instances where it is desirable to seal the engine coolant system from exposure to air. As shown in FIG. 4 the reservoir 136 can include such a diaphragm or bellows element 400 attached to the coolant reservoir 136 at an appropriate location within the overall expansion volume of the reservoir. Also detailed is the (vented) fill cap 163, and a vacuum breaker element 466 that communicates with the volume of the reservoir 136. This arrangement will allow for a small amount of replenishing coolant to flow from the reservoir 163 into to the coolant circuit, as may be required to address any minor circuit leakages, while limiting the exposure of the coolant to air.

In overview, the hydronic water circuit is composed of the hydronic circulator 137, the opposing side of the heat exchanger 182, the hydronic boiler 135, and the hydronic water circuit which, in turn, is composed of a distribution manifold 185, the zone valves 187, the individual zone piping circuits 161, the space heating devices (not shown), the water heater coil 196 and the return hydronic water pipe 183. The hydronic water circuit contains typical hydronic heating accessory components such as an expansion tank, automatic makeup water feed valve, and water pressure safety relief valve (not shown). This hydronic water circuit is a closed-circuit (i.e. under pressure and not open to the atmosphere). Water quality would not normally be controlled and no additives would generally be applied to the circuit's water. The hydronic water circuit is filled and maintained at pressure by connection to the pressurized domestic water system using the automatic water feed valve. Normal economic engineering practice allows for cast iron pump, pipe and boiler components where appropriate (given rust considerations), along with certain copper-alloy components. Water in this hydronic circuit, as in conventional hydronic heating systems, tends to contain a certain level of corrosion products and erosion particles that are expected to remain within tolerable limits.

The domestic hot water circuit is the flow-through circuit that delivers utility-supplied or well-supplied potable water to the water heating appliance and then to various points of use in the building. This circuit is separate from the engine coolant circuit and hydronic water circuit and consists of a cold water inlet pipe 198, the opposing side of the heat exchanger (a coil) 196, a storage tank 132 (customarily), and a water supply pipe 199.

The hydronic heating unit assembly 105 is located within the interior of the building space. The electric power generator 102 is also located indoors. It may also be located outdoors if this is more convenient. Hydronic conduits (pipes) 161 connect the hydronic heating unit 105 to a one or more heating zones in the building by way of the distribution manifold 185 and the zone valves 186, with each heating zone containing any of several types of space heating devices, such as baseboard radiators or radiant panels, and one or more of which may connect to a domestic water heater 132. The hydronic water which is circulated through the hydronic boiler 135 and through the system of pipes 161 returns to the hydronic heating unit through a combined return pipe 183. Flow of heat to each zone is regulated by the zone valve 186 which is controlled by a thermostat 142 in each zone, or in the case of the water heater by a temperature sensor 197 in the water heater. A commonly used alternative to the use of the zone valves for the control of hydronic water flow to the different zones is the use of individual hydronic water circulators in each of the zones. These provide similar ability to control the hydronic water flow (on or off) in each zone.

In this embodiment shown in FIG. 1, the hydronic water circuit is thermally interconnected to the engine coolant circuit by heat exchanger 182. This heat exchanger is typically the brazed flat plate type as these provide high efficiency and compactness at low cost. As defined herein, the power generator 102 can be any acceptable electric generating device that converts fuel into electric energy and heat. The power generator 102 consists of a liquid cooled engine (the term "engine" as used herein including, for example, an internal combustion engine, steam engine, Stirling engine, fuel cell, thermoelectric device, or another liquid-cooled, heat-producing type and powered by alcohol, wood products, gasoline, diesel, hydrogen, propane, natural gas or another fuel). In this embodiment shown in FIG. 1, the generator is a fuel-powered internal combustion engine 103 that operates an electric power generator 123. The fuel line 108 is a gaseous or liquid fuel line that also services the burner 184 of the hydronic heat unit 105 (described further below). The generator 123 directs power over a cable 145 to the building through an interface on the control module 106 for the system. Control signals are, likewise, exchanged between the power generator 102 and control module via a cable 146 (or another acceptable link). These signals control starting and stopping of the engine 103, its speed, power output and monitor various functions.

In an illustrative embodiment, the sizing of the power generator takes into account the annual time-averaged electric power consumption for the typical home in United States, which is approximately 1 kilowatt (kW). This time-averaged power demand of about 1 kilowatt yields, with a year comprising 8760 hours, a total electric energy demand of approximately 8760 kilowatt hours per year. Thus, without consideration to matching electric loads to on-site electrical generation capacity, the desired size of a residential electric generating machine would be about 1 kW, operating continuously throughout the year. Of course, some structures and/or residences may have higher than typical electric consumption, with time-averaged use on the order of 2 kW, but the general principles and features of the present invention remain the same. Electric generators of the durability and quality that would apply to use in a hydronic heating micro-CHP system are generally expensive and for this reason it is very desirable that the electric generator be of a minimum size and operated with high utilization (i.e., high load factor). As a practical matter, in many instances, the limited electric power generation capacity of a micro-CHP system, such as the 1 kW capacity specified, and the varying on-site electric loads can be accommodated by a parallel connection 131 to the utility grid, with power flowing in from the grid when demand exceeds the generation capacity of the on-site generator and power flowing out to the grid when the generation capacity of the on-site generator exceeds the on-site demand. Such produced, or cogenerated, electric power is most conveniently applied by direct interconnect with the local electric grid that provides a constant electric load, independent of the actual power consumption level at any given time in the building itself, such connection generally know as parallel connection to the utility grid. Such an arrangement is most attractive under a "net metering" financial arrangement between the producer of the cogenerated electric power and the electric utility company, but other uses and economic arrangements for valuing such power generation are feasible and within the capability of the present invention. Batteries 190 can also be used to accommodate the steady generation and time varying electric load, but not as conveniently. Such batteries are charged via regulation provided by the control module 106.

The consequence of this specified sizing of approximately 1 kW (to about 2 kW) for routine power generation to the design of a warm air micro-CHP system is that the available heat generation capacity of the electric power generating device will be small in comparison to the typical needed installed capacity for space heating. With the approximate 20% fuel to electric conversion efficiency that is attainable with small electric generators, a 1 kW electric generator will at best produce about 4 kW of heat. Assuming 90% of this kW of heat can be usefully recovered, the net heating capacity will be about 3.6 kW thermal. This is to be compared to the typical installed capacity of the typical hydronic heating system in a home of about 30 to 40 kW thermal. The thermal output capacity of the electric generator would be thus only be slightly more than 10% of the normal installed capacity for heating. Even a 2 kW generator would supply about only 20% of the normally installed heating capacity. Nevertheless, operation of the electric generation with the simultaneous production of this limited heat output can still supply a substantial total fraction, if not the majority, of the annual heating energy needed for a residence on account of the fact that the full heating capacity is typically needed for only few hours on the coldest days of the year. Nonetheless, such limited heating capacity must be supplemented by an auxiliary heating system of capacity nearly equal to that which would normally be installed (with no heat producing engine-generator).

One example of an acceptable electric power generator for use with the various embodiments described herein is the MCHP generator unit, currently under development by Honda Motor Corp. of Japan. This generator utilizes a single cylinder 163 cc-displacement engine that produces 1 kW of electric power at continuous run levels along with 3.25 kW thermal energy via a built-in coolant circuit. This circuit includes an integral inlet and outlet that can be interconnected with conduits 133, 138 to provide the needed circulation of heated coolant according to this invention. As noted above, use of other types, sizes and models of generators is expressly contemplated.

In this embodiment, the electrical power generator 102 is located indoors near the hydronic heating unit 105. This allows direct venting of the products of combustion of both units to the outdoors with a single venting conduit 176. However, a variety of outdoor placements are expressly contemplated. Noise, vibration, odor, or safety aspects of any particular electric power generator may make it desirable to install the generator outdoors. Also, the indoor electric power generator 102 and hydronic heating unit 105 may is be vented to the outdoors separately with separate vent pipes for each unit.

The engine 103 includes a heat exchanger 126 that can be part of the engine block or a heat sink. In general, the heat exchanger is an element that may be normally provided with the engine in a commercial embodiment, and the coolant circuit is directed via coolant circulation conduits 133 and 138. The products of reaction or combustion of the fuel in the power generation device (exhaust) are vented to the outdoors through vent 121 and vent pipe 180 to the flue gas collector 178. Water condensate, which may be normally produced in the burning of many fuels in such devices, is routed in the condensate conduit 139 into the building for disposal in a drain 160. For example the water vapor dew point of condensate in burning natural gas is approximately 135° F. The conduits circulate coolant flow using an inline circulation pump 134 that has a rating sufficient to maintain proper coolant flow and heat exchange. The pump 134 may be of multiple speeds in order to handle normal and high-output modes of operation of the engine-generator 102.

The hydronic heating unit 105 may contain the hydronic boiler 135, the hydronic circulator 137, the heat exchanger 182, the liquid coolant pump 134, the liquid coolant reservoir 136 and the control module 106. The hydronic boiler 135 can be any of a number of commercial designs for hydronic boilers and includes components of the fired heat exchanger, fuel burner, and combustion controls. A so-called low-mass, fan-powered combustion type is desirable for the hydronic boiler 105 to minimize thermal losses during periods when the hydronic boiler burner is not operating and heat is being supplied to the system by the engine generator 102. Typical types would be those commercial types made from coils of tubing or from compact aluminum castings. Note that the engine generator 102 and the hydronic heating unit 105 are shown as two distinct physical units in FIG. 1.

However, this invention contemplates that all components of the system may be enclosed in one housing or cabinet or that the certain components, such as the heat exchanger 182, may be physically located within either the engine-generator unit or the hydronic heating unit.

The hydronic boiler 135 may have the capability of working at different levels or stages of heat output. The hydronic boiler 135 may be of either a condensing or non-condensing type, referring to whether or not the unit is a high-performance heat exchanger that cools the combustion products to a point where water vapor in the combustion products is condensed or is a low or medium performance heat exchanger that cools the combustion products to a temperature that is above the water dew point of the combustion products. The hydronic boiler is located downstream of the heat exchanger 182 so as to provide the coolest hydronic water returning from the building to the heat exchanger 182.

In the illustrated configuration, the electric power generator 102 has a venting conduit 180 to the outdoors to vent combustion products. Typically, but not necessarily, the combustion gas vent 120 of the hydronic boiler 105 can be combined with the vent 180 of the electric power generator 102 for the purposes of simplifying installation.

Also described in FIG. 1 is a combustion products blower 175 that is used to induce a negative pressure at the vents of both the electric power generator 102 and the hydronic boiler 135 so as to force the exhaust gas, at low positive pressure to the outdoors through the vent conduit 176. This configuration applies to either natural or forced draft combustion versions of both the electric power generator 102 and the hydronic heater 105. Proof of venting flow capability (i.e. absence of a blocked vent) in such an arrangement can be provided by use of negative pressure gas sensor (not shown) at the inlet 178 to the combustion products blower 175.

The venting arrangement shown in FIG. 1 also prevents backflow of combustion gases from the electric power generation device into the hydronic boiler during periods when the auxiliary heater is not operating. Significant blockage of the vent conduit downstream of the combustion products blower 175, due to debris or other factors, is detectable by the failure to achieve a predetermined negative pressure at the inlet 178. The venting arrangement shown in FIG. 1 can also used by way of a engine cabinet venting conduit 179 to vent incidental gas or fume emissions from the electric power generation device that may be a hazard or an annoyance, such as lubrication oil fumes or small combustion product leakages. The combustion products blower 175 is typically of a multi-speed type, with the speed controlled in response to the status of operation of the electric power generation device 102 and the hydronic boiler 135 so as to minimize power consumption and unnecessary flow of air through non-operating components.

The hydronic boiler 135 is connected to the control module 106 by the electric power conducting cables 191 and the control signal cable 189 that, respectively, provide the motive power and operational control to, for example, the combustion fan and burner fuel valve. In general, the control module 106 operates to receive signals from any of the active components of the hydronic heating micro-CHP system and makes any control actions necessary to sustain the performance, safety, and integrity of the system. A function of the control module 106 is to operate the hydronic circulator at the appropriate speed depending on the functional state of the engine generator 102 and the hydronic heating 105. The operation of the controller 106 is described in greater detail below.

The present invention provides near constant low-level heating of the building solely by the heat output of the engine generator 102. The hydronic boiler 135 provides auxiliary heat only during those periods, as determined by the controller 106, when the heat supplied by the engine generator unit 102 is insufficient to maintain or attain the desired building space temperature or domestic water temperature. Typical for a U.S. residence, the rated capacity of the hydronic boiler must be sufficient to deliver about 25 to 40 kW of heat under maximum heat load conditions. The range of speed of the hydronic circulator pump 137 provides an appropriate flow of hydronic water at the relatively low heat output of the engine generator unit 102 and an appropriate higher flow of hydronic water at the relatively high heat output existing when the hydronic boiler 135 is operating at full capacity in conjunction with the engine generator unit 102. The ratio of the hydronic water flow rates at the limits of operation of the pump (high/low) for the system may be in range of approximately 3 to 8, depending on the specific size of the components. Typically, the hydronic circulator pump is of type that has significantly reduced power consumption when operating at low speed.

The control module 106 is connected to an indoor thermostat 142, outdoor temperature sensor 143, a control-display panel 144 that provides status and interface information for the cogeneration system, and all other electric power and electronic sensing elements in the system. The thermostat 142 can be any of the commercially available models used for control of the space heating systems in buildings, including both digital communicating thermostats or conventional switching thermostats.

Figure 3:
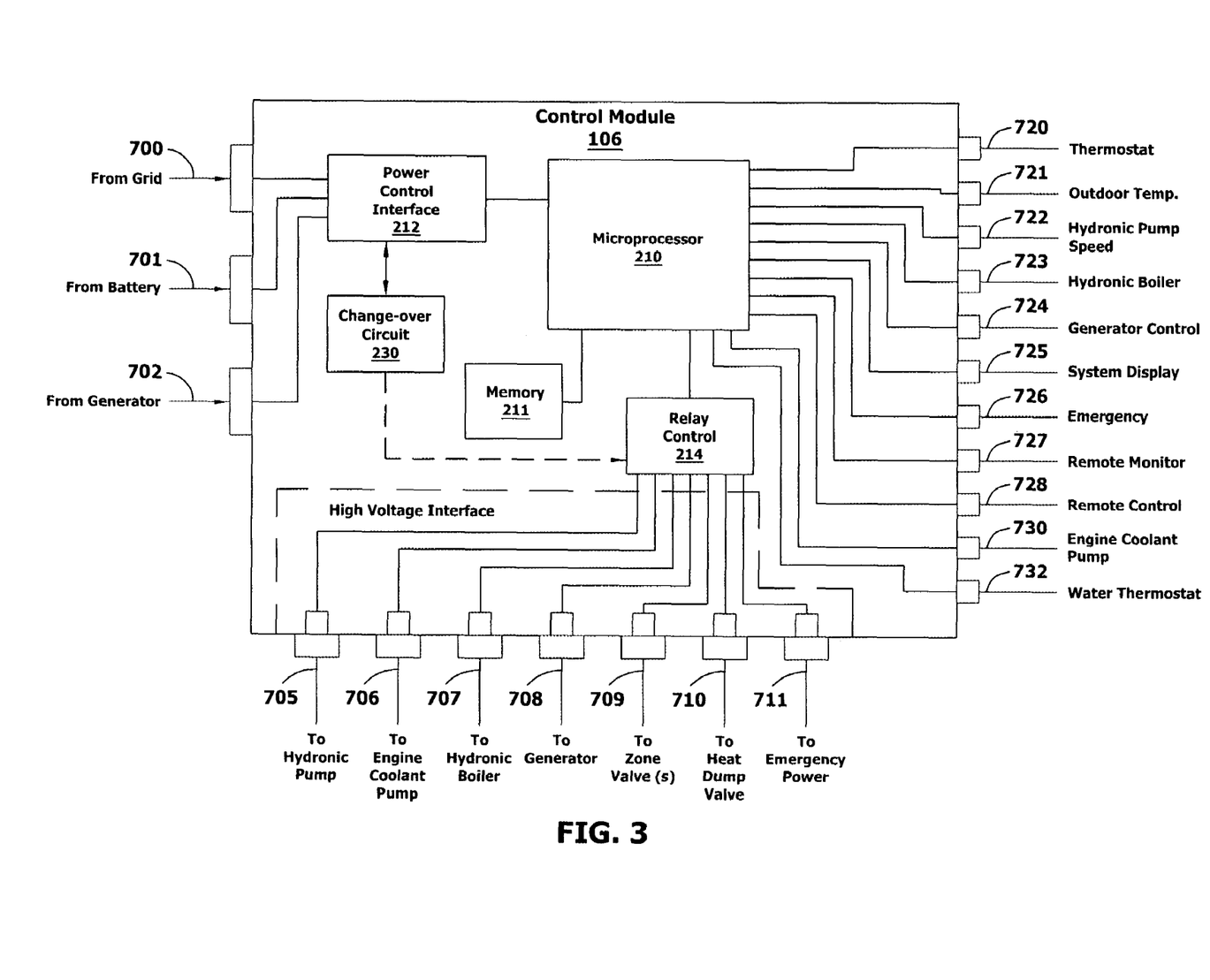
FIG. 3 is schematic diagram of a control module for hydronic heating micro-CHP system.

The control module 106 according to an illustrative embodiment is shown in FIG. 3. The control module 106 contains electric power switching elements and electronic logic and control elements. The module 106 is managed by an on-board microprocessor 210 that accesses a program memory 211 for both operational instructions and storage of user/system-input settings and information. In addition, the microprocessor controls (typically high-voltage) outputs to operate the various mechanical components of the system. A multi-port relay control 214 interfaces with the microprocessor, and selects which outputs to operate. A variety of models and types of microprocessors, microcontrollers, state machines and the like, and associated control programs can be employed—and these should be clear to those of ordinary skill. Based upon the appropriate program, the microprocessor interprets sensor inputs to carry out the functions needed for system operation as outlined generally below.

More particularly, the microprocessor communicates with various sensors (connections 720-732) that monitor various statuses and operational parameters. The micro-processor 210 also interfaces with a power control interface 212. This interface handles high voltage inputs from the grid, battery and power generator 102 (connections 700-702) and the microprocessor monitors and balances these inputs based upon the interface's signals. The electric power connections to the control module 106 may include: electric power from the grid 131 (connection 700); electric power from the battery 190 (connection 701); electric power from the electric power generator 123 (connection 702); electric power to the hydronic circulator pump 137 (connection 705); electric power to the engine coolant pump 134 (connection 706); electric power to the hydronic boiler 135 combustion and operating controls (connection 707); electric power to starting elements of the power generator 102 (e.g. engine starter motor, etc, not shown) (connection 708); electric power to the heat dump valve 188 (connection 710); electric power to hydronic water heating circuit zone valve(s) (connection 709, 709a, 709b, as needed); and electric power to one or more circuits (changeover switches) to supply emergency electric power during grid power outages (connection 711). Control circuit connections, either analog or digital, to the control module 106 include the building thermostat(s) 142 circuit (connection 720, 720a, 720b, as needed); the outdoor temperature sensor circuit 143 (connection 721); the hydronic circulator pump 137 speed control circuit (connection 722); the hydronic boiler control circuit (connection 723); the power generator control circuit (connection 724); a circuit to the system operating and control display 144 (connection 725); a circuit to control the switching of electric power from the grid to the electric power generating device during grid outages (changeover switch—not shown) (connection 726), a circuit for remote monitoring of the system performance (connection 727), and a circuit for the remote control of the electric power generating capability (connection 728). As indicated by the description above the control module may be configured with electric power and operating logic and control circuits that provide for operation and control of multiple heat zones in the building, each with their own thermostat. The control module can also include control logic and hardware for remote control as well as remote and local monitoring and diagnosis of the micro-CHP system.

Having described its general structure, the control module 106 functions so as to operate the various components of the system such that they make maximum use of the power generator 102 as the source of heat energy for warm air space heating while maintaining the thermostat(s) 142 at the desired set-point temperature(s). The control module 106 therefore operates the hydronic heating micro-CHP system with the following basic logic:

(a) when a space or water heating demand is detected by a thermostat 142 or sensor 197, heat is first and preferentially supplied to the appropriate heating zone by operation of engine generator unit 102, by operation of the circulating engine coolant pump 134, by heat transfer from the engine coolant circuit into the hydronic coolant loop by heat exchanger 182, and circulation of heated hydronic water to the appropriate zone by the operation of hydronic circulator 137. During such periods of operation of the system solely with the engine generator 102 as the heat source, the operating temperatures throughout the engine coolant and the hydronic water circuits will be determined by the magnitude of the heat generated by the engine and the heat dissipation capacity of the hydronic heating devices in operation at that particular time. In essence the temperatures in the coolant and hydronic loops will equilibrate to the existing operating conditions; and (b) when (i) the space heating demand in any zone, as detected by a thermostat 142 located in the heated space, cannot be satisfied within a reasonable time with the heat energy supplied solely by the engine generator unit 102 and (ii) the operating temperature of the hydronic water circuit is below that specified by the control logic for the current thermal load conditions, then the hydronic boiler 135 is also operated, at one or more stages of heat delivery capacity, to raise the hydronic water temperature to a specified level and hence deliver the additionally needed heat until the demand is met as detected by the thermostat 142. During such time periods, the burner of the hydronic boiler will be operated on the same logic commonly used with units which is that the burner will fire to maintain the supply hydronic water temperature with a certain maximum and minimum values, such maximum and minimum values which may routinely and automatically adjusted by the controller according to operating conditions (such as so-called "outdoor temperature reset").

The warm air micro-CHP system operation as described in (a) and (b) above can be improved through the use of the outdoor temperature sensor 143 and additional control logic in the control module's microprocessor 210 that uses the outdoor air temperature for anticipating the heating demands that will signaled by the thermostat 142. Outdoor temperature has been commonly used to allow for the adjustment of the operating temperature of conventional hydronic heating systems—as the outdoor temperature declines the controlled boiler temperature, and thus the temperature of the hydronic water throughout the heating system, is increased to ensure capacity of heat delivery into the heated spaces (so-called outdoor reset). This matching of the hydronic water temperature to the overall demand for heat, based on the outdoor temperature, provides for improved energy efficiency, more steady system operation, and improved thermal comfort. In the current invention such an outdoor sensor 143 is incorporated for similar functionality, but is also used by the control module 106 to determine when there is a sustained need for heat supply to the building that is approximately equal to or greater than the heat generation capacity of the engine generator unit. Once the outdoor temperature drops below a determined benchmark temperature "Z", such as 50° F., the control module 106 calls for the continuous operation of the electric power generator 102 and heat supply to the various zones in the heated space. The benchmark outdoor temperature Z is the temperature below which the total heat demand of the building can be expected to exceed the steady state heat output of the engine generator 102. Such benchmark temperature can be expected to be in the general range of about 40° to 50° F. for northern US located systems based on the sizing of the engine-generator described herein relative to the design-condition heat demand of the building (say at 0° F.), with building heat demand approximately proportional to the difference between the controlled indoor temperature and the outdoor temperature.

Such continuous operation of the engine-generator and continuous heat delivery, rather than relying on conventional room-thermostat-controlled activation of intermittent heat delivery, is particularly advantageous as it will reduce that number of engine starting and stopping events that may otherwise occur. Operation of the generator 102 may be terminated by the controller if the thermostat 142 or other temperature sensor located in the building's heated space indicates that the temperature of the heated space has risen some small amount above the thermostat set-point, thereby indicating that excess heat is being supplied. The additional level of heat load detection and control logic provided by the outdoor temperature sensor provides an anticipatory control function that tends to increase the use of the electric power generator 102 as the source of heat for the building, and conversely, minimizes the use of the hydronic boiler as the heat source. The control module's microprocessor can also be provided with self-learning logic, that automatically adjusts the benchmark outdoor temperature Z (for constant generator running) based on the operating history of the system to maximize the run time and total heating contribution of the electric power generating device 102. For example, if after some number of hours of continuous running while the outdoor temperature is between 49° and 50° F. and there are no recorded terminations, manually by the building occupants or automatically by the controller 106, due to excess heating, then the Z temperature can be automatically increased to 51 degrees, and the process of self-adjustment repeated as necessary.

The basic operating behavior (logic) as described in (a) and (b) above can be further modified to account for the operating temperature limitations of the engine. Some electric power producing engines, under the previously generally defined general category that applies to this invention, may be limited with respect to the temperature of the coolant that may be returned to the engine. In particular, a fuel cell, thermoelectric, any other type of electric power producing device may have a maximum coolant return temperature that is below the desired maximum hydronic heating temperature. Many existing hydronic heating systems in buildings require that the supply temperature of the hydronic water be on the order of 200° F. in order to provide sufficient heating on very cold days or when a rapid recovery of the room temperature from a thermostat set back period is desired. Under such conditions, the temperature of the hydronic water returning to the hydronic heating unit 105 may be above the allowable maximum engine return coolant temperature, as the temperature decline of the hydronic water in the heating zones may be as little as 10° F. Thus, the present invention provides for the controller 106 to have programmable logic that recognizes these specific conditions and terminates the operation of the engine generator 102 for those periods in order to ensure its integrity during the time periods when the high hydronic water temperature is desired, which in total duration will likely be small relative to the total duration of the annual heating demand. With this control feature, all new and replacement hydronic heating applications can be accommodated without concern that the temperature limitations of the engine coolant will result in diminished heating function in comparison to conventional hydronic heating systems. Such feature will be best implemented with a control logic that adjusts the desired operating temperature of hydronic heating system upward as the outdoor temperature declines (i.e. outdoor temperature reset) as described above. Thus, the operating logic will add to that provided in (a) and (b) above allowing for the shutdown of the engine generator unit during those periods when the hydronic heating system is called upon by the controller to provide a more rapid heating response than is possible with the engine-generator alone and the desired operating temperature (based on outdoor temperature or other factors) in the hydronic water circuit is at a temperature level that is above the maximum coolant temperature of the engine.

The controller 106 basic logic can also be further improved by allowing it to impose a minimum operating time on the engine-generator unit 102. Generally, it will be desirable to avoid rapid starting and stopping of heat-producing electric power generation unit. Frequent starting and stopping cycles can lead to mechanical and thermal transients that can stress the engine and reduce operating lifetime and reliability. Avoiding frequent cycling is generally more desirable for engines than in comparison to conventional hydronic boiler and fuel-fired heating appliances, which can cycle frequently during normal operation. Minimum cycle time for heat producing electric power generation devices of the size range of interest can be expected to be at least 10 minutes, compared to conventional heating appliances that can operated without specific minimum "on" or "off" times and are most often controlled by controllers that do not enforce minimum on-off cycle periods. Because of the relatively small size of the heat output of the class of engine-generator of this invention, it is not likely that specification of any reasonable minimum cycling time will adversely impact temperature control in the building.

The controller's (106) basic operational logic can also be improved by allowing for the user of the system to conveniently specify, at the display 144 or the thermostat 142, other desirable operational limits on the operation of the electric power generation unit 102. For example, the user may wish to specify that the unit 102 not operate during certain periods of the day when the user may wish to have no noise produced by the unit, regardless of how low a level of noise it may actually produce, thereby giving the user control of his acoustic environment as may be desired.

The controller's (106) basic operational logic (a) and (b) above, with the several described improvements, has application to hydronic heating micro-CHP systems that involve single and multiple space heating zones. However, use of the logic with multiple space heating zones generally implicates a further consideration as to how the different zones are to be operated, especially during the periods of continuous engine operation (as initiated at benchmark outdoor temperature Z). Factors with which the controller must contend during such continuous engine operation include (1) the random sequencing of the demand for heat in each zone as indicated by the several thermostats in the different heating zones; (2) the differing thermal response characteristics of each zone to operation of the hydronic heating devices and the need to provide reasonably responsive thermal control in all zones; (3) the need to provide a continuous transfer of heat from the engine coolant so as to sustain the continuous engine generator operation and avoid an unacceptably high engine coolant temperature; and (4) the desire to minimize the operation of the hydronic boiler as source of heat. Factor (2) relates to the fact that, in reality, the ratio of space heating deliver capacity installed in a zone (whether it include baseboard, radiant panel, under-floor heating, or some combination thereof) relative to heat demand requirement of that zone is not likely to be uniform among the several zones. Simply stated, some zones can be expected to have higher heating demands relative to the installed heat delivery capacity than do other zones. Thus, the building temperature in these zones can be expected to be slower to respond to the control sequence of thermostatic demand detection followed by heating supply. Zones of this characteristic will habitually operate in the "on" mode for greater durations compared to other zones.

These above four factors, relating to control during operation below benchmark outdoor temperature Z, and control during all other times, can be most precisely handled by the use of modern digital communicating thermostats in each in each of the zones, with each of these communicating digital thermostats providing a continuous flow of information to the controller 106 about the current set-point in each zone (including set back cycles) and the current room temperature. From such wealth of information the controller can be programmed to deliver the heat produced by the engine generator such that it is preferentially directed to zones exhibiting the greatest demand for heat (i.e. differential between the current set-point and the actual room temperature) while ensuring that heat is dispatched among the several zones without leading to overheating in any particular zone. Criteria for operating parameters can also be established for bringing on the additional supply of heat from the hydronic boiler such that the operation of hydronic boiler will be minimized and the maximum engine coolant temperature limit, if any, and the minimum engine run time limit, if any, are not violated. Essentially complete operational status of the multi-zone system would be known with the exclusive use of digital communicating thermostats in all zones and an operating logic can be deduced that will meet the four requirements listed above. These types of systems can also have self-learning capability to optimize performance characteristics such as average engine on time and total hydronic boiler runtime. Thus, use of digital communicating thermostats for all zones is part of the present invention.

Greater control difficulty comes into play when attempting to deploy a hydronic heating micro-CHP system while using some or all of an existing set of "conventional switching-only" zone thermostats (herein defined as thermostats that lack a communication capability (e.g. communication with other thermostats or a remote unit/processor) other than the basic ability to switch a load on or off) and thermostat wiring. Indeed, many, if not most, candidate applications for the hydronic heating micro-CHP system will involve replacing existing boilers in established buildings and the installer will often wish to avoid the cost of a complete set of communicating thermostats to replace the existing non-communicating, conventional switching-only thermostats as well as to avoid the cost and inconvenience of installing new thermostat connection digital communication wires in the existing finished wall structures. The present invention thus also provides practical designs for achieving favorable operation of hydronic heating micro-CHP for multiple zone heating systems without the need for a complete set of digital communicating thermostats and associated new wiring.

First among these designs for installations of multi-zone hydronic heating micro-CHP systems using conventional switching-only thermostats, is the use of a timer function in the logic of the controller 106 for each of the several heating zones. This timer function is for the purpose of allowing, during periods of continuous engine operation below benchmark temperature Z, non-uniform run times among the different zones during the periods of time when (i) there is not specific signal for heat from the a conventional thermostat and (ii) operation of such non-signaling zones is required to provide dissipation of the total amount of engine heat. Ratios of run times of such non-heat-signaling zones is settable and adjustable by the system installer and user so as to achieve better overall building thermal control with a continuously running engine during the non-heat signaling periods when compared to that which would be achieved based on full time operation of the heat delivery elements (baseboards, etc.) in all non-heat-signaling zones. Thus, the mode of operation of a multi-zone heating system having conventional switching-only thermostats during the continuous engine-run period occurring "below benchmark outdoor temperature Z," following the basic logic (a) and (b) above, will be:

(a1) when a space or water heating demand is detected by a thermostat 142 or sensor 197, heat (i.e. hydronic water circulation) is first and preferentially supplied to appropriate heating zones solely by operation of the engine-generator 102;

(b1) when (i) the space heating demand in any zone, as detected by a thermostat 142 located in the heated space, cannot be satisfied within a reasonable time with the heat energy supplied solely by the engine generator unit 102 and (ii) the operating temperature of the hydronic water circuit is below that specified by the control logic for the current thermal load conditions, then the hydronic boiler 135 is also operated, at one or more stages of heat delivery capacity, to raise the hydronic water temperature to a specified level and hence deliver the additionally needed heat until the demand is met as detected by the thermostat 142;

(c1) during periods when there is an existing thermostatic demand for heat in one or more zones and the engine is in continuous operation on account of the outdoor temperature being below the benchmark outdoor temperature Z, the delivery of heat to non-heat-demanding zones will be initiated only upon the rise of the engine coolant temperature to a level that approaches the desired or limiting maximum operating temperature and only when the burner on the hydronic boiler is not operating;

(d1) during periods when there is no thermostatic demand for heat in any zone and the engine is in continuous operation on account of the outdoor temperature being below the benchmark outdoor temperature Z, the delivery of heat to non-heat-demanding zones will be initiated and sustained; and (e1) heat flow to any non-heat-demanding zones under (c1) or (d1) will continue as necessary by timed operation of the different non-heat-demanding zones such that the relative amounts of time of operation of each zone (for example, as a percentage of running time) will follow a schedule (sequence and relative duration) set and fixed manually by the human operator upon system installation and other occasions.

An example illustrates the application of the control logic (a1) to (e1). During winter weather, a hydronic heating micro-CHP system will be in the mode of constant engine operation. During some periods, especially during night setback periods, there will be occasions, even in multi-zone systems, when no thermostat will be calling for heat. Still, however there is a need to dissipate the heat usefully in the building. By setting the adjustable zone timers in the controller 106, the zones can be operated such that low level heat output of the engine during this time can, for example, be preferentially delivered to the zone or zones encompassing the first floor and specifically not the bedrooms. These timer settings would not interfere with, or affect, the normal response of the system to thermostat demands, as heat flow to heat-signaling zones are always activated. Any thermal comfort dissatisfaction resulting from the delivery of engine produced heat to non-heat-demanding zones can likely be circumvented by further adjustments of the adjustable zone timers.

Other implementations of the thermostat systems for multi-zone hydronic heating micro-CHP systems may involve combinations of conventional switching-only thermostats, room temperature sensors, or digital communicating thermostats, but the general principles would be the same as the above described defining cases of a complete set of digital communicating thermostats and a complete set of conventional switching only thermostats.

Based upon the foregoing, it should be recognized that the majority of the heat energy supplied to the building can be supplied by the small heat output engine generator over the heating season. In almost all geographic areas, to a differing extent, the greatest heating demand (very cold days) is relatively rare. A heating system should, however, have capacity to deal with that rare event, and the installed capacity is set for that event, but the time-averaged heating capacity is much less than the maximum and the heat-producing electric generation system of this invention is tailored to that average heat demand. The engine-generator provides the base heating capacity during the more prevalent hours of cool and moderately cold weather and is to be supplemented by the hydronic boiler typically only for the less-frequent and more-severe outdoor temperature conditions.

A further function of the control module 106 is to operate the electric power generator 102 during periods of electric grid outage (emergencies, blackouts, etc.) so that the operation of the complete hydronic heating micro-CHP can be sustained and certain priority electrical loads (water, heat control, basic lighting, refrigeration, etc.) in the building can be sustained during the outage. During such period of operation for emergency power supply the heat produced by the engine can be delivered to the building in the same operational logic (a) and (b) with improvements as described above. However, if it is undesirable to have any space heating effect, such would be during summer electric grid outages, then heat can be conveniently rejected from the system by the periodic opening of the solenoid valve 188 and disposal of the heated water in the normal domestic water drainage system. Alternatively, the controller 106 can have provisions for the system operator to pre-designate any particular zone or zones to be used as the means of heat dissipation during such periods of emergency operation in warm weather, including a zone that includes a heat exchanger (air or water cooled) that is for no other purpose than the dissipation of such unwanted heat during emergency power generation during warm weather.

Note that the system is adapted to provide for electric power demand during a grid outage that may exceed the normal rated power capacity (for example the 1 kW considered appropriate for routine cogeneration of heat and electric power throughout an average year). This feature of the invention maximizes the utility of the components in the system by providing a high-power operating state for the power generator 102. In general, the lifetime of many electric power generating devices is dependent on the rate or speed of operation. An internal combustion engine-powered electrical generator is good example of this general principle. For the routine and cost-effective cogeneration applications, equipment lifetimes exceeding about 20,000 hours are desired. To achieve such long lifetimes, the engine is typically operated at only low or moderate speeds. However, during periods of electrical outage, which constitute a very small percentage of the total operating time (typically less than 1%) it would be permissible to operate the engine at a higher speed to generate additional power—provided that the electrical components, engine cooling system, and other components are also designed to handle this higher speed. For example, an engine running normally at 1 kW and 1800 rpm might be set to run at a peak of 2500 rpm to achieve a 2 kW output for limited time periods. Thus, the illustrative embodiment includes in the control module 106 the capability (via signal output 726, etc.) to temporarily switch the electrical generator device into a higher speed or rate of operation that, while not desirable for long-term cogeneration duty, would be acceptable for the relatively short duration of electrical outages.

For emergency operation, the control module 106 further includes changeover circuitry 230 that can isolate, automatically or manually, the electrical output of the generating device 102 from the incoming power line of the electric utility and routing the produced electric power to electrical loads present within the building. Part of the priority electrical load to be sustained by the generator 102 during an outage is the hydronic heating system itself, with its pump, ignition controls, operating controls and other electric power-consuming components (represented generally by interface connections 705-711). These components must be switched from the electric grid to the power output terminals of the power generator 102. The control module 106 also may have the functionality of signaling the power generator to operate at a higher electric power output during the period of time that the electric grid outage is occurring, so as to increase the amount of electric power available for use in the building during the outage (signal output 726). Further, the control module 106 may have the capability of providing power from the battery 190 (via input 701) to the power generator 102 for starting during periods of electrical outage (via output 708).

The control module 106 may also have the capability for connection to the well-known Internet or another communication network for the purposes of remote monitoring (via connection 727) of the system performance from off-site locations and the purposes of off-site controlling (via connection 728) of the operation of the power generator 102, as may be desirable during periods of peak electric demand.

The control-display panel 144 is provided for the purposes of displaying the history and current status of the system operation, including the operating mode, fuel usage, electric power generation, and the occurrence of any operational failures, abnormal operating conditions, or other system fault messages that may be appropriate. The control-display panel 144 can be located at any location within the building and also provides a convenient location for changing of system control settings, such as a basic on-off switch and the benchmark outdoor temperature Z as described above. As also noted, the panel can be supplemented with a display running interactively on the graphical user interface of a personal computer (not shown) in the building, or at a remote location anywhere in the world. This computer, when located locally, can be directly connected to the module 106 via a network cable or another appropriate interface (using, for example, connections 727 and 728). Appropriate network interface cards can be provided to both the module 106 and the computer. The computer should include a software application that interprets a data stream from the module, and that enables control inputs to the module. A graphical user interface can be provided to display and manipulate such data. Construction of such an application and interface should be clear to those of ordinary skill.

This invention also contemplates and further utilizes the control capability of the variable speed hydronic circulator pump 137. This will be useful in minimizing the electric power consumption of the pump during the periods when only the engine-generator is producing heat at a low level in comparison to the hydronic boiler.

Figure 2:
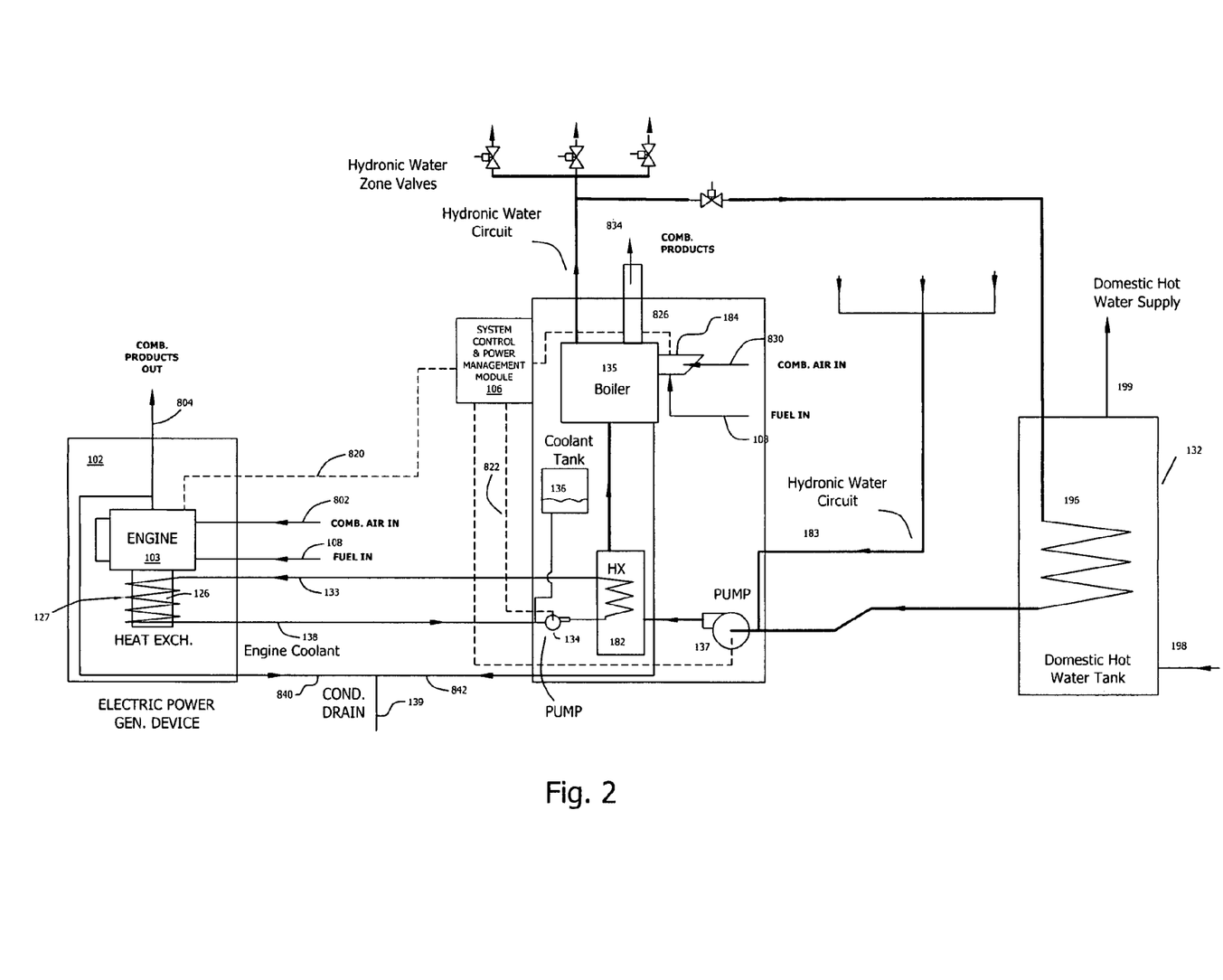
FIG. 2 is a schematic diagram of a generalized flow through the hydronic heating micro-CHP system of FIG. 1.

Before describing various alternate embodiments of the hydronic heating micro-CHP system according to this invention, reference is made to FIG. 2, which provides the reader with an understanding of the flow characteristics of the basic system as shown in FIG. 1. Fuel enters the engine 103 via line 108 along with combustion air (line 802). These react to generate electricity via the generator that is routed through the control module 106 (through one of the depicted dashed lines (dashed line 820) indicating an electrical/signal link). The engine's combustion products are vented as exhaust (line 804). Heat created in the combustion process is routed through a heat exchanger 126 that carries it away from the engine 103 to prevent overheating. As needed, coolant is driven by the pump 134 (connected to module 106 by dashed line 822), via conduits 133 and 138, to heat exchanger 182 thereby carrying off heat.

The engine coolant, carrying the heat from the engine 103, passes through the heat exchanger 182 in the cabinet of the hydronic heating unit. Hydronic heating water is circulated by the pump 137 through the heat exchanger 182 and to the various heating zones. As needed, the hydronic boiler adds additional heat to the hydronic water to raise its temperature to the desired operating level. The hydronic boiler 135 receives combusted fuel and air through a burner 184 that is controlled and powered via dashed line 826. Fuel for the burner 184 is received from line 108 and combustion air is received via line 830. The combustion gas exits the hydronic boiler substantially cooled, as the majority of heat is transferred to the hydronic water flow. This is vented as combustion products along line 834. Combustion typically produces water as a byproduct. Thus, the engine vents water to a drain 139 along line 840. The boiler vents direct any condensate water to the drain 139 along line 842.

The hydronic heating micro-CHP system shown in the above-described figures, in accordance with various embodiments of the present invention taken alone, and in various combinations of components, provide a system and method for the practical and optimum routine utilization of a liquid-cooled electric power and heat generating device, with low heat output capability, for routine cogeneration and emergency generation of electric power as part of a hydronic space heating system that employs conventional hydronic boiler heating technology and provides a heat delivery capacity sufficient to maintain thermal comfort in multiple zones of a building under all weather and heat-demand operating conditions.

The foregoing has been a detailed description of an illustrative embodiment of the invention. Various modifications can be made without departing from the spirit and scope thereof. For example, the hydronic heating unit 105 can be wall mounted or a free standing floor unit and the various heat exchangers in the system can have a variety of shapes formed from a variety of materials. Likewise, the performance specifications of various system components, such as the electric power generator, given in illustrative example are sized to an average building size and power consumption and located in a moderate climate. The specifications can be changed to better suit buildings with higher or lower power consumption and heating needs. In addition, while a grid is shown as the external power source, another external power source such as a main larger-output generator can also be the external power source. Accordingly, this description is meant to be taken only by way of example, and not to otherwise limit the scope of the invention.

What is claimed is:

1. A system for the space-heating of a building to a desired temperature and generation of electrical power comprising:
   a fuel-burning electric power generator being electrically connected to the building electrical service, the electric power generator being constructed and arranged to transfer heat produced by an engine of the electric power generator therefrom to a first circulating liquid stream;
   a heat exchanger for transferring said heat from said first circulating liquid stream into a second circulating liquid stream that delivers heat to different locations within the building
   an auxiliary heater located in the second circulating liquid stream so as to transfer additional heat to the second circulating liquid stream, the auxiliary heater being heated by an auxiliary heat source separate from and not thermally connected to the electric power generator; and
   a control module that operates a first circulating pump for driving the first circulating liquid stream and a second circulating pump for driving the second circulating liquid stream, the electric power generator, auxiliary heater, and flow control components in the second circulating liquid stream to maintain the desired building temperature while optimizing the utilization of the electric power generator as a source of heat for the building.

2. The system as set forth in claim 1 wherein the heat is provided to different temperature control zones in the building and the different zones are operated in an optimal way so as to maximize the utilization of the electric power generator as the source of heat for the building.

3. The system as set forth in claim 1 wherein the system is constructed and arranged to operate either or both of the first pump and the second pump, respectively, at different speed levels to produce different fluid flow rates, each of the speed levels being controlled by the control module.

4. The system as set forth in claim 1 wherein the control module is constructed and arranged to:
   a) first exclusively operate the electric power generator to supply heat to the building, and
   b) if space heat demand cannot be satisfied by (a), then operate the auxiliary heater.

5. The system as set forth in claim 1 wherein the electric power generator includes a vent pipe for electric power generator combustion gasses interconnected with a vent pipe from the auxiliary heater for auxiliary heater combustion gasses.

6. The system as set forth in claim 1 wherein the electric power generator is located in an interior space of the building.

7. The system as set forth in claim 1 wherein the electric power generator is located outside the building with an insulated cover enclosing conduits for carrying the first circulating liquid stream and a line for draining condensate from the electric power generator.

8. The system as set forth in claim 1 wherein the control module is constructed and arranged to direct electrical power to a plurality of components of the system so as to maintain operation of pumps and an auxiliary heater to provide space heat to the building at a desired temperature.

9. The system as set forth in claim 1 wherein the control module and the electric power generator are each constructed and arranged to operate the electric power generator at an electric power output level greater than a continuous running electric power output level when power is unavailable from the external electric power source, the electric power generator being operable while power is unavailable from the external electric power source with or without a request for heat in the building.

10. The system as set forth in claim 9 further comprising a heat dissipate interconnected with the first or second circulated liquid stream, to dissipate heat to an indoor or outdoor location when a request for space heat is not present.

11. The system as set forth in claim 1 wherein the second circulated liquid stream is directed to a heat exchanger that transfers heat to domestic water for the building.

12. The system as set forth in claim 1 further comprising a valve assembly and valve control for controlling the second circulated liquid stream so that priority can be given to transferring heat to the domestic water over transferring heat to building air spaces.

13. The system as set forth in claim 1 wherein the control module is operatively connected to each of one or more indoor thermostats and a remote control panel that displays system operating status and that enables control of system component operation by a user.

14. The system as set forth in claim 1 further comprising an outdoor temperature sensor operatively connected with the control module so as to enable the control module to adjust system performance, by variation of the hydronic water temperature, based upon a sensed outdoor temperature.

15. The system as set forth in claim 1 wherein the control module is constructed and arranged to provide continuous operation of the electric power generator below an established outdoor temperature and the control module is adapted to provide transfer of heat to each of a plurality of zones in the building independent of load sensing limitations of conventional switching-only thermostats.

16. The system as set forth in claim 1 wherein the control module is adapted to terminate operation of the electric power generator during periods of time when the required operating temperature of the second circulating liquid stream is above a maximum engine operation temperature of the first circulating liquid stream.

17. The system as set forth in claim 1 wherein the control module is adapted to enable operation of the auxiliary heater only for predetermined circumstances when the electric power generator cannot sustain a desired temperature of the second circulating liquid stream.

18. The system as set forth in claim 1 wherein the control module is adapted to allow for minimum engine run time independent of an actual demand for heat initiated by at least one thermostat in an air space of the building.

19. The system as set forth in claim 1 wherein the controller can be adjusted to provide for a preferred distribution of heat within each of a plurality of heating zones in the building during periods without a specific thermostat demand and with continuous operation of the electric power generator.

20. The system as set forth in claim 1 further comprising a cabinet that encloses together the heat exchanger between the first circulated liquid stream and second circulated liquid stream with each of the hydronic boiler and an engine coolant tank of the electric power generator.

21. The system as set forth in claim 1 wherein the engine of the electric power generator comprises any one of a (a) liquid-cooled internal combustion engine, (b) liquid-cooled Stirling engine, (c) steam engine, (d) liquid-cooled fuel cell, and (e) thermoelectric generator.

22. The system as set forth in claim 1 wherein the control module is constructed and arranged to optimize operation of at least one heating zone of the building for maximum use of the electric power generator as a priority source of heat for the building.

23. The system as set forth in claim 1 wherein the first circulating liquid is pressurized through hydrostatic pressure in a tank vented to atmospheric pressure and components of a circuit containing the first circulating liquid are adapted to provide simple filling of the circulating liquid circuit by addition of further amounts of the first circulating liquid to the tank.

24. The system as set forth in claim 23 further comprising one of either flexible expansion diaphragm or bellows in communication with the tank to limit exposure of the first circulating liquid stream to ambient air.

25. The system as set forth in claim 1 wherein an electrical generating capacity of the electric power generator for normal operation is sized to be equal to an expected time-averaged electrical demand for the building.

26. The system as set forth in claim 1 wherein the control module includes a self-learning logic constructed and arranged to use actual operating history of the system to establish conditions for operation of the electric power generator that provide for maximum utilization of the electric power generator as the source of heat for the building.

27. A method for space heating a building and generating electric power for the electrical service of the building in conjunction with an external electric power source that is also interconnected with the building electrical service comprising:
  operating a liquid-cooled electric power generator at a continuous running rated output level to deliver electricity to the electrical service when a request for space heat is made;
  while operating the electric power generator, circulating coolant from the electric power generator to a primary heat exchanger interconnected with a hydronic heating circuit so as to transfer heat from the coolant to the hydronic heating circuit;
  operating an auxiliary heater inline with the hydronic heating circuit when heat transferred from the primary heat exchanger is insufficient to provide desired space heat to the building; and
  controlling operation of the primary heat exchanger and the auxiliary heater to:
  (a) first exclusively operate the primary heat exchanger to transfer heat to the hydronic heating circuit, and
  (b) if space heat demand cannot be satisfied by (a), then operate the auxiliary heater in combination with the primary heat exchanger to transfer the additional heat to the hydronic heating circuit.

28. A method for space heating a building and generating electric power for the electrical service of the building in conjunction with an external electric power source that is also interconnected with the building electrical service comprising:
  operating a liquid-cooled electric power generator at a continuous running rated output level to deliver electricity to the electrical service when a request for space heat is made;
  while operating the electric power generator, circulating coolant from the electric power generator to a primary heat exchanger inline with a hydronic heating circuit so as to transfer heat from the coolant to the hydronic heating circuit;
  operating an auxiliary heater inline with the hydronic heating circuit when heat transferred from the primary heat exchanger is insufficient to provide desired space heat to the building; and
  providing continuous operation of the electric power generator below an established outdoor temperature and the transferring heat to each of a plurality of zones in the building independent of load sensing limitations of conventional switching-only thermostats.

29. The method as set forth in claim 27 wherein further comprising optimizing operation of at least one heating zone of the building for maximum use of the electric power generator as a priority source of heat for the building.

30. The method as set forth in claim 27 further comprising emergency-operating the electric power generator either when a demand for space heat is made or a demand for space heat is not made when electric power is unavailable from the external power source and, when a demand for space heat is not made, dissipating to an outdoor location heat in the circulated coolant.

31. The method as set forth in claim 30 wherein the step of emergency-operating includes operating the electric power generator at an output level that is higher than the continuous running rated output level.

32. The method as set forth in claim 27 further comprising providing fuel to the electric power generator and the auxiliary heater from a single fuel source.

* * * * *